US007052105B2

(12) United States Patent
Ushigome

(10) Patent No.: US 7,052,105 B2
(45) Date of Patent: May 30, 2006

(54) BATTERY RESIDUAL CAPACITY DETECTION METHOD AND PRINTING APPARATUS USING THE METHOD

(75) Inventor: Yosuke Ushigome, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 10/765,857

(22) Filed: Jan. 29, 2004

(65) Prior Publication Data

US 2004/0183840 A1 Sep. 23, 2004

(30) Foreign Application Priority Data

Jan. 31, 2003 (JP) ............................ 2003-024319

(51) Int. Cl.
*B41J 29/393* (2006.01)
*G01D 9/20* (2006.01)

(52) U.S. Cl. ........................................ 347/19; 346/113

(58) Field of Classification Search .................. 347/19, 347/5

See application file for complete search history.

(56) References Cited

U.S. PATENT DOCUMENTS 4,313,124 A 1/1982 Hara
4,345,262 A 8/1982 Shirato et al.
4,463,359 A 7/1984 Ayata et al.
4,723,129 A 2/1988 Endo et al.
4,740,796 A 4/1988 Endo et al.
5,182,583 A * 1/1993 Horigome et al. ............ 347/19
5,631,677 A * 5/1997 Horigome et al. ............ 347/19
5,673,070 A * 9/1997 Nakanishi et al. ............ 347/19
5,835,107 A * 11/1998 Suzuki et al. ................. 347/19
5,963,006 A * 10/1999 Otani ......................... 318/696
6,062,670 A * 5/2000 Iwata et al. ................... 347/23

FOREIGN PATENT DOCUMENTS

JP 7-32703 2/1995
JP 7-132650 5/1995
JP 10-336400 12/1998

* cited by examiner

*Primary Examiner*—K. Feggins
*Assistant Examiner*—Shelby Fidler
(74) *Attorney, Agent, or Firm*—Fitzpatrick, Cella, Harper & Scinto

(57) ABSTRACT

A battery residual capacity detection method capable of accurately detecting a battery residual capacity while minimizing reduction of throughput of a printing apparatus. In a printing apparatus, to which the method is applied, operable with at least a battery power source, during printing on a printing medium by reciprocate-scanning a printhead mounted on the printing apparatus, a battery voltage is detected, thereby a battery residual capacity is detected. It is determined whether or not the detected battery residual capacity is equal to or less than a predetermined threshold value. In accordance with the result of determination, driving of a carriage motor to reciprocate-scan the printhead and that of a conveyance motor to convey the printing medium are controlled so as to provide a time zone where loads on the carriage motor and the conveyance motor do not overlap, and the battery residual capacity is detected in the time zone where the loads do not overlap.

11 Claims, 9 Drawing Sheets

FIG. 6

RESIDUAL CAPACITY TABLE

| DETERMINATION LEVEL ( DIGITAL VALUE ) | RESIDUAL CAPACITY | PROCESSING BASED ON DETERMINATION |
|---|---|---|
| GREATER THAN a | LARGE | DISPLAY LARGE RESIDUAL CAPACITY INDICATION |
| a OR LESS | MEDIUM | DISPLAY MEDIUM RESIDUAL CAPACITY INDICATION |
| b OR LESS | SMALL (WARNING) | DISPLAY SMALL RESIDUAL CAPACITY (WARNING) INDICATION |
| c OR LESS | ERROR | PERFORM ERROR PROCESSING |

BATTERY RESIDUAL CAPACITY DETECTION METHOD AND PRINTING APPARATUS USING THE METHOD

CLAIM OF PRIORITY

This application claims priority under 35 U.S.C. §119 from Japanese Patent Application No. 2003-024319, entitled "Battery Residual Capacity Detection Method", and filed on Jan. 31, 2003, the entire contents of which are incorporated herein by reference.

FIELD OF THE INVENTION

The present invention relates to a battery residual capacity detection method and a printing apparatus using the method, and more particularly, to a battery residual capacity detection method applied to a portable inkjet printing apparatus with both AC and DC power sources.

BACKGROUND OF THE INVENTION

Recently, in accordance with development of downsized mobile electronic devices, portable personal computers are widely used, and portable small products are increased as peripheral devices for such personal computers. Generally, as mobile devices use a battery as a driving power source, a function of notifying a user of a battery residual capacity is indispensable.

As battery residual capacity (residual electric capacity in a battery) detection methods, the following two methods are known.

One method is an energy integration method of integrating discharged electric current and subtracting the integrated current value from a total capacity of a battery. This method has an advantage that the residual capacity can be calculated with high accuracy, but has a disadvantage that, as a system realizing the method is complicated, this results in a relatively high cost.

The other method is a voltage detection method of estimating a residual capacity from a battery voltage. Since it is difficult to estimate a residual capacity from a battery voltage, this method has a disadvantage that the accuracy of battery residual capacity detection is low, but the method has an advantage that, as a system realizing the method is simple, it can be realized at a low cost.

The present invention relates to the method of detecting a battery residual capacity by using the voltage detection method.

In a case where a battery residual capacity is detected by utilizing the voltage detection method, as a proper voltage cannot be detected when the battery is under no load, it is necessary to apply a predetermined load to the battery. However, in electronic devices having an actuator such as a stepping motor, the load is often unstable depending on the driving status. On the other hand, even in one battery, as an output voltage varies depending on load, it is necessary to create a status under a predetermined load for battery residual capacity detection.

For this purpose, conventionally, voltage detection is performed in a status where the battery is under a predetermined load while the motor held in a stopped state is intentionally excited. The intentional excitation of a motor held in a stopped state for battery voltage detection will be referred to as "dummy excitation".

In a portable inkjet printing apparatus, when a battery voltage is lowered and a necessary battery residual capacity for normal operation of the apparatus cannot be ensured, it is necessary to perform processing including discharging of a printing medium such as a print sheet from the apparatus main body and capping of a printhead for preventing the ink discharge surface of the printhead from drying and the like before the power is turned off.

Further, in a case where it is determined as a result of battery residual capacity detection of the printing apparatus that the battery does not have a sufficient residual capacity for the above power-off processing, the operation of the apparatus is stopped before completion of the processing. Since this may damage the printhead, such inconvenience must be most carefully avoided when the battery residual capacity becomes small in a portable inkjet printing apparatus. As a precautional measure against such trouble, it may be arranged such that dummy excitation and battery voltage detection are frequently performed when the apparatus is driven with a battery.

However, dummy excitation cannot be always performed. Especially, in an electronic apparatus having plural motors such as an inkjet printing apparatus, dummy excitation must be performed when all the motors are stopped or a battery is under a predetermined load. Accordingly, the operation of battery residual capacity detection is periodically performed in a battery-driving printing operation sequence.

Generally, a printing apparatus operates through a predetermined sequence from power-on, printing, to power-off to a certain degree. In other words, as a next operation including a user's print instruction can be predicted to a certain degree, the operation of battery voltage detection by dummy excitation is set at an arbitrary timing in the apparatus operation sequence, thereby battery voltage can be detected by a predetermined time.

In this operation sequence of a printing apparatus, it is also necessary to detect a battery voltage during printing using a printhead. For example, upon printing character patterns such as text, printing time is not so long and the battery residual capacity causes no problem; however, upon printing a photograph, a figure or the like, it takes a comparatively long time by the completion of printing. In such case, there is a possibility that the battery residual capacity is reduced during the printing and termination processing cannot be normally performed. For this reason, it is necessary to perform battery voltage detection during printing.

Further, Japanese Patent Application Laid Open Nos. 7-32703, 7-132650 and 10-336400 propose control for suppression of battery consumption by lowering a printing speed and/or printing quality when a battery residual capacity becomes small.

However, since dummy excitation during printing takes time, the printing speed is extremely lowered.

On the other hand, one of the significant capabilities of a printing apparatus is printing speed. Particularly, a printing speed when printing is continuously performed on plural print sheets (continuous printing) is represented as throughput (in ppm (pages per minute), i.e., the number of print sheets per minute). This is an indicator of printing speed of the printing apparatus.

Accordingly, it is necessary to detect a battery voltage during printing, and it is necessary to avoid reduction of printing speed due to dummy excitation for the battery voltage detection.

SUMMARY OF THE INVENTION

Accordingly, the present invention is conceived as a response to the above-described disadvantages of the conventional art.

For example, a battery residual capacity detection method and a printing apparatus using the method according to the present invention is capable of performing more accurate battery residual capacity detection while minimizing reduction of throughput of the printing apparatus.

According to one aspect of the present invention, preferably, a battery residual capacity detection method in a printing apparatus operable with at least a battery power source, comprises: a detection step of detecting a battery voltage thereby detecting a battery residual capacity while printing is performed on a printing medium by reciprocate-scanning a printhead mounted on the printing apparatus; a determination step of determining whether or not the battery residual capacity detected at the detection step is equal to or less than a predetermined threshold value; and a detection control step of controlling driving of a carriage motor to reciprocate-scan the printhead and driving of a conveyance motor to convey the printing medium so as to provide a time zone where a load on the carriage motor and that on the conveyance motor do not overlap in accordance with the determination result at the determination step, and controlling the detection step so as to detect the battery residual capacity in the time zone where the loads do not overlap.

More particularly, in the above method, it is preferable that the conveyance motor is a stepping motor, and that the time zone where the loads do not overlap includes a time zone after excitation to stop the conveyance motor to stop conveyance of the printing medium and before driving of the carriage motor to move the printhead.

Further, it is preferable that the detection control step includes a step of, if it is determined that the battery residual capacity is greater than the predetermined threshold value, controlling the driving of the carriage motor and that of the conveyance motor so as to provide a time zone where the carriage motor and the conveyance motor are simultaneously driven, so as to increase a printing speed.

Further, it is preferable that the printing apparatus is also operable with an AC power source.

In accordance with the present invention as described above, during printing on a printing medium by reciprocate-scanning a printhead mounted on a printing apparatus operable with at least a battery power source, a battery voltage is detected so as to detect a battery residual capacity, then it is determined whether or not the detected battery residual capacity is equal to or less than a predetermined threshold value. In accordance with the result of determination, driving of a carriage motor to reciprocate-scan the printhead and that of a conveyance motor to convey the printing medium are controlled such that a time zone where a load on the carriage motor and that on the conveyance motor do not overlap is provided, and the battery residual capacity is detected in the time zone.

According to another aspect of the present invention, preferably, a printing apparatus operable with at least a battery power source, comprises: a carriage motor to generate a driving force to reciprocate-scan a carriage holding a printhead; a conveyance motor to generate a driving force to convey a printing medium; detection means for detecting a battery voltage thereby detecting a battery residual capacity while printing is performed by the printhead on the printing medium by reciprocate-scanning of the carriage; determination means for determining whether or not the battery residual capacity detected by the detection means is equal to or less than a predetermined threshold value; and detection control means for controlling driving of the carriage motor to reciprocate-scan the printhead and driving of the conveyance motor to convey the printing medium so as to provide a time zone where a load on the carriage motor and that on the conveyance motor do not overlap in accordance with the determination result of the determination means, and controlling the detection means so as to detect the battery residual capacity in the time zone where the loads do not overlap.

Further, preferably, an inkjet printing apparatus is used as the printing apparatus to which the present invention is applied, and an inkjet printhead is mounted on the printing apparatus.

In such case, it is preferable that the ink-jet printhead has electrothermal transducers to generate thermal energy to be supplied to ink for discharging the ink by utilizing the thermal energy.

The invention is particularly advantageous since a battery residual capacity can be accurately detected.

Further, in a case where it is determined that the battery residual capacity is greater than the predetermined threshold value, it may be arranged such that drive control is performed such that a time zone where the carriage motor and the conveyance motor are simultaneously driven is provided, thereby reduction of printing throughput can be minimized.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a state transition diagram showing an operation sequence of the printing apparatus from power-on;

FIG. 6 is a residual capacity table referred to upon residual capacity control based on a detected battery voltage value;

DETAILED DESCRIPTION OF THE PREFERRED EMBODIMENTS

Preferred embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

Furthermore, the term "battery residual capacity" or "residual capacity" means residual electric capacity, which can still produce electric power, in a battery.

Figure 1:
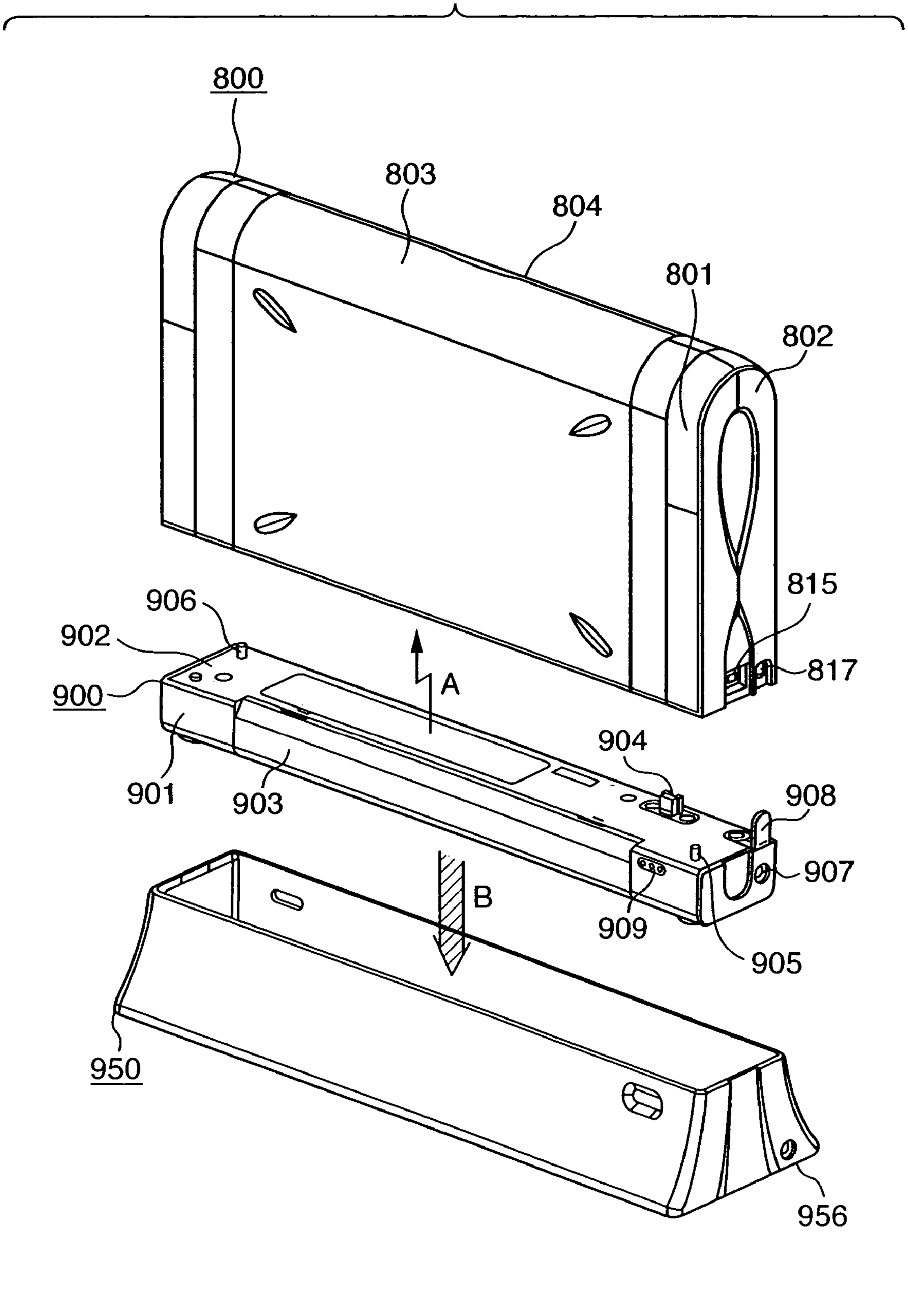
FIG. 1 is a perspective view showing the overall arrangement of an inkjet printing apparatus as a typical embodiment of the present invention.

FIG. 1 is a perspective view showing the overall arrangement of an inkjet printing apparatus (hereinafter referred to as "printing apparatus") operable with both AC and DC power sources according to a typical embodiment of the present invention. As shown in FIG. 1, the printing apparatus includes an inkjet printer 800 (referred to as "printer"), a battery charger 900 which incorporates a battery and is detachable from the printer main body, and a cradle 950 serving as a mount for vertically housing the printer and battery charger while attaching them. A paper sheet will be exemplified as a printing medium for printing by the printer. The present invention is not limited to this, and can be applied to any printable sheet-like medium.

In FIG. 1, the outer appearance of the printer 800 is an integral shell structure comprised of an upper case 801, lower case 802, feed cover 803, and discharge port cover 804. The printer 800 takes this form when it is not used (stands still or is carried). The side surface of the printer 800 has a "DC in" jack (DC power input jack) 817 for inserting an AC adapter cable (not shown) used when power is supplied from an AC power source, and an I/F (interface) connector 815 for connecting a USB cable. The feed cover 803 functions as a printing sheet supply tray which is opened from the printer main body to support a printing sheet such as a paper sheet in printing.

The outer appearance of a battery charger 900 is comprised of a main case 901, cover case 902, and battery lid 903. The battery lid 903 is detached to open the main case 901, allowing removing a battery pack integrating a battery.

The mounting surface (connection surface) of the battery charger 900 to the printer 800 has a main body connector 904 for electrical connection, and fixing screws 905 and 906 for mechanical attachment and fixing. The battery charger 900 is connected to the printer main body in a direction indicated by an arrow A in FIG. 1 to drive the printer 800 by the battery. The top surface of the battery charger 900 has a charge indicator 909 which indicates the residual capacity of the battery. The side surface of the battery charger 900 has a "CHG-DC in" jack 907 for inserting the AC adapter cable, and a cover plate 908 for covering the "DC in" jack 817 of the printer 800 when the battery charger 900 is attached.

A cradle 950 functions as a mount by inserting the printer 800 in a direction indicated by an arrow B in FIG. 1 while the battery charger 900 is attached to the printer 800. Note that the cradle 950 has an opening 950 so that the printer 800 can be charged by inserting the AC adapter cable into "CHG-DC in" jack 907 even when the battery charger 900 and the printer 800 are attached to the cradle 950.

Figure 2:
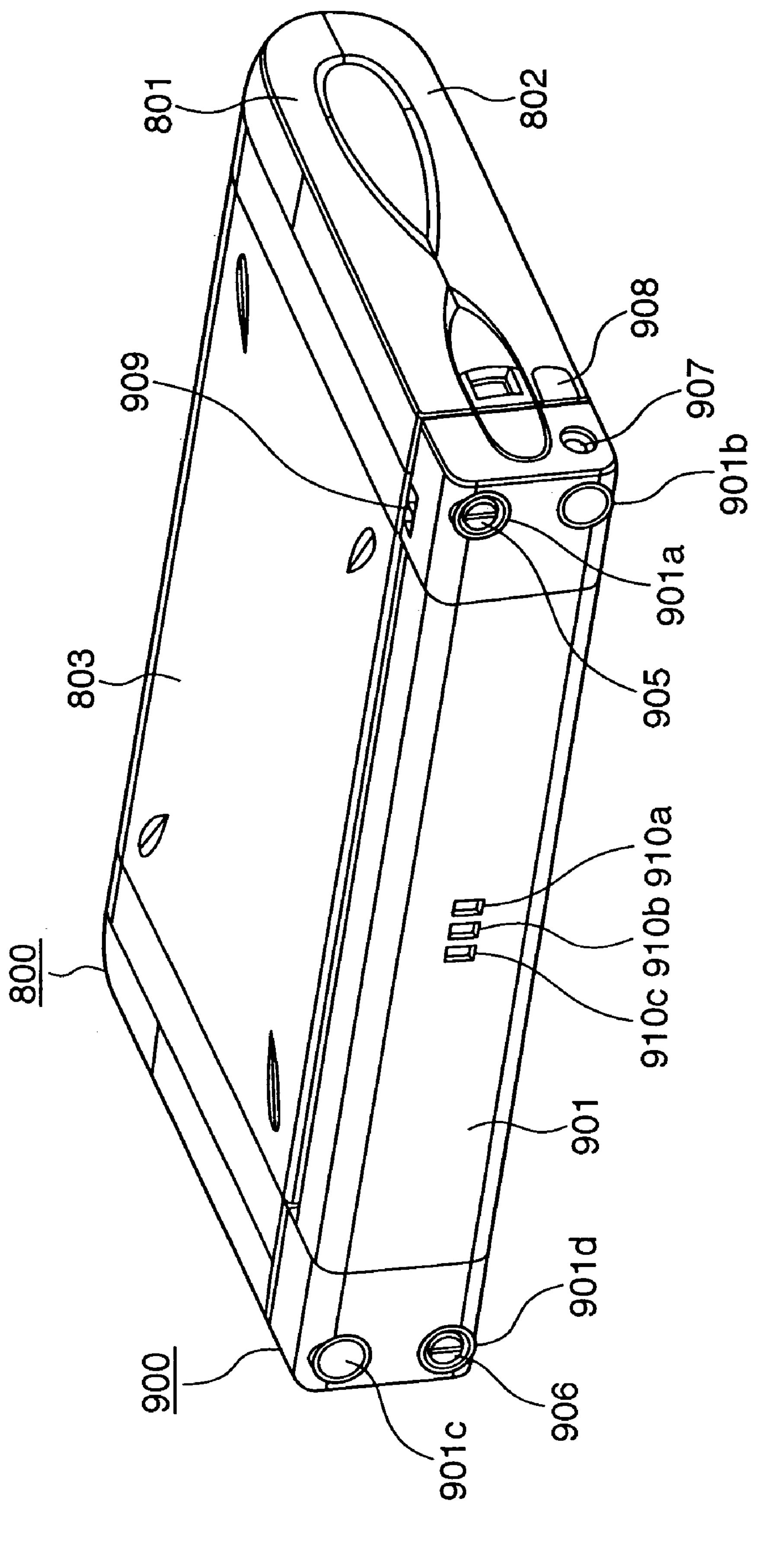
FIG. 2 is a perspective view of an inkjet printer in FIG. 1 to which a battery charger is attached.

FIG. 2 is a perspective view showing a state in which the battery charger 900 is mounted on the printer 800 when the printer back surface and printer top surface are viewed diagonally from the top.

As shown in FIG. 2, the battery charger 900 is attached to the back surface of the printer 800, and fixed with the fixing screws 905 and 906 so that the printer 800 becomes a battery-driven printer.

As described above, the "DC in" jack 817 of the printer 800 is covered with the cover plate 908 of the battery charger 900. In attaching the battery charger 900, a user reliably inserts the AC adapter cable to the "CHG-DC in" jack 907 of the battery charger 900, thus preventing erroneous insertion.

The back surface of the battery charger 900 has four legs 901*a*, 901*b*, 901*c*, and 901*d* on the main case 901. This back surface also has contacts 910*a*, 910*b*, and 910*c* for electrical contact upon attachment to the cradle 950.

As shown in FIG. 2, the charge indicator 909 of the battery charger 900 is arranged at a position where, even when the feed cover 803 is opened, the feed cover 803 does not interrupt visual recognition on the top surface on which the charge indicator 909 can be easily visually recognized in mounting or using the printer 800.

Figure 3:
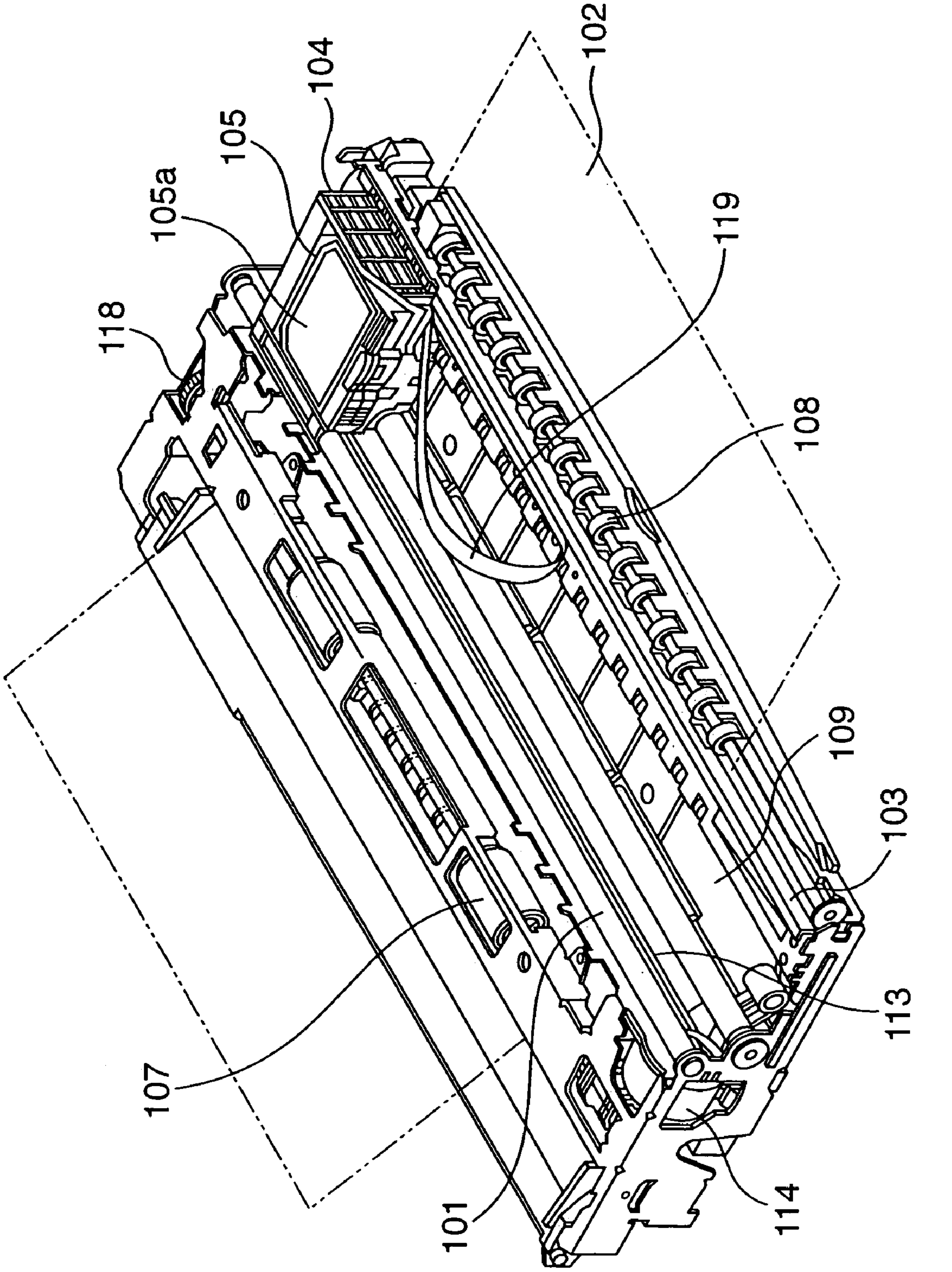
FIG. 3 is a perspective view showing the internal structure of a printer 800.

FIG. 3 is a perspective view showing the internal structure of the printer 800.

As shown in FIG. 3, a printhead 105, mounted on a carriage 104, is reciprocated in a lengthwise direction along a guide rail 103. Ink discharged from the printhead 105 is attached to a printing medium 102 where its printing surface is regulated on a platen (not shown) with a slight interval from the printhead 105, and forms an image on the print medium.

The printhead 105 is supplied with a print signal via a flexible cable 119 in correspondence with image data.

Note that in FIG. 3, numeral 114 denotes a carriage motor to scan-move the carriage 104 along the guide rail 103. Numeral 113 denotes a carriage belt to transmit a driving force of the carriage motor 114 to the carriage 104. Further, numeral 118 denotes a conveyance motor connected to a conveyance roller 101 to convey the printing medium 102.

Further, the printhead 105, connected to an ink tank 105*a*, constructs a head cartridge. As the structure of the head cartridge, the printhead and the ink tank may be separable from each other or may be integral with each other.

Further, numeral 107 denotes a pickup roller to pickup the printing medium 102 upon paper feed and guide the printing medium into the apparatus. Numeral 108 denotes a paper discharge roller to discharge the printing medium 102 to the outside of the apparatus upon paper discharge.

Almost all the above mechanical parts are attached to a base chassis 109 of the apparatus.

Figure 4:
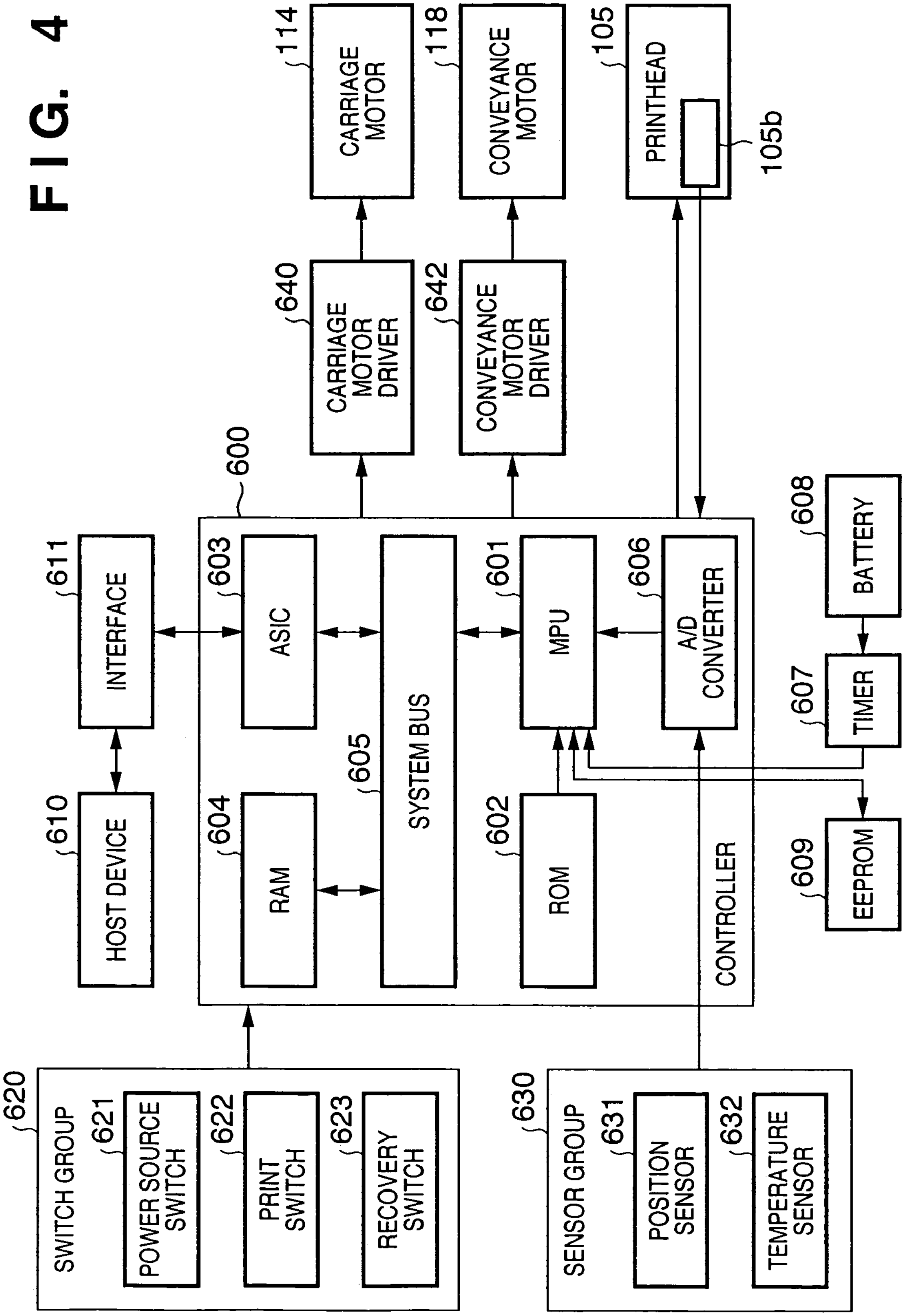
FIG. 4 is a block diagram showing a control construction of the printer 800 shown in FIGS. 1 to 3.

FIG. 4 is a block diagram showing a control construction of the printer 800 shown in FIGS. 1 to 3.

As shown in FIG. 4, a controller 600 has an MPU 601, a ROM 602 holding a program corresponding to a control sequence to be described later, a required table, and other fixed data, an Application Specific Integrated Circuit (ASIC)

603 to generate control signals for controlling the carriage motor 114, the conveyance motor 118 and a printhead 105, a RAM 604 having an image data mapping area and a work area for execution of program, a system bus 605 interconnecting the MPU 601, the ASIC 603 and the RAM 604 for data transmission/reception, an A/D converter 606 to input analog signals from a sensor group to be described later and A/D convert the signals and supply digital signals to the MPU 601, and the like.

Further, in FIG. 4, numeral 610 denotes a computer (or a reader for image reading or digital camera) as an image data supply source generically called a host device. Image data, commands, status signals and the like are transmitted/received between the host device 610 and the printing apparatus via an interface (I/F) 611.

Further, numeral 620 denotes a switch group including switches for receiving instruction inputs from an operator such as a power source switch 621, a print switch 622 for print start instruction, and a recovery switch 623 for instruction of start of processing (recovery processing) to maintain ink discharge performance of the printhead 105 in excellent status. Numeral 630 denotes a sensor group for detection of apparatus status including a position sensor 631 such as a photo coupler for home position detection, a temperature sensor 632 provided in an arbitrary position of the printing apparatus for detection of environmental temperature, and the like.

Further, numeral 640 denotes a carriage motor driver which drives the carriage motor 114 to reciprocate-scan the carriage 104 along the guide rail 103. Numeral 642 denotes a conveyance motor driver which drives the conveyance motor 118 to convey the printing medium 102.

Upon print scanning by the printhead 105, the ASIC 603 transfers drive data (DATA) for printing elements (discharge heaters) to the printhead while directly accessing the storage area of the RAM 602.

Note that the printhead 105 includes a head temperature sensor 105*b* for measurement of head temperature.

Further, the printer 800 is provided with a timer 607 which can operate with electric power supply from a small battery (a lithium battery, a nickel hydride battery, an alkali button battery, a silver oxide battery, a zinc-air battery or the like) 608 so that the timer can continue its clocking operation even when electric power supply from AC and DC power sources is stopped. Time counted by the timer 607 is stored in a nonvolatile memory 609 such as an EEPROM. Note that as the nonvolatile memory, an FeRAM, an MRAM and the like may be used in addition to the EEPROM.

Note that, since the printing apparatus is operable with both an AC power source and a DC (battery) power source, even if the AC adapter (not shown) is pulled out when the apparatus operates with AC electric power supplied from the AC adapter, the apparatus can still continue its operation with electric power supplied from the DC (battery) power source. Thus, the printing apparatus has a mechanism to discriminate AC adapter driving from battery driving. Since such mechanism is well known, the detailed explanation thereof will be omitted.

Next, battery residual capacity detection processing using the voltage detection method applied to the printing apparatus having the above structure will be described.

Figure 5:
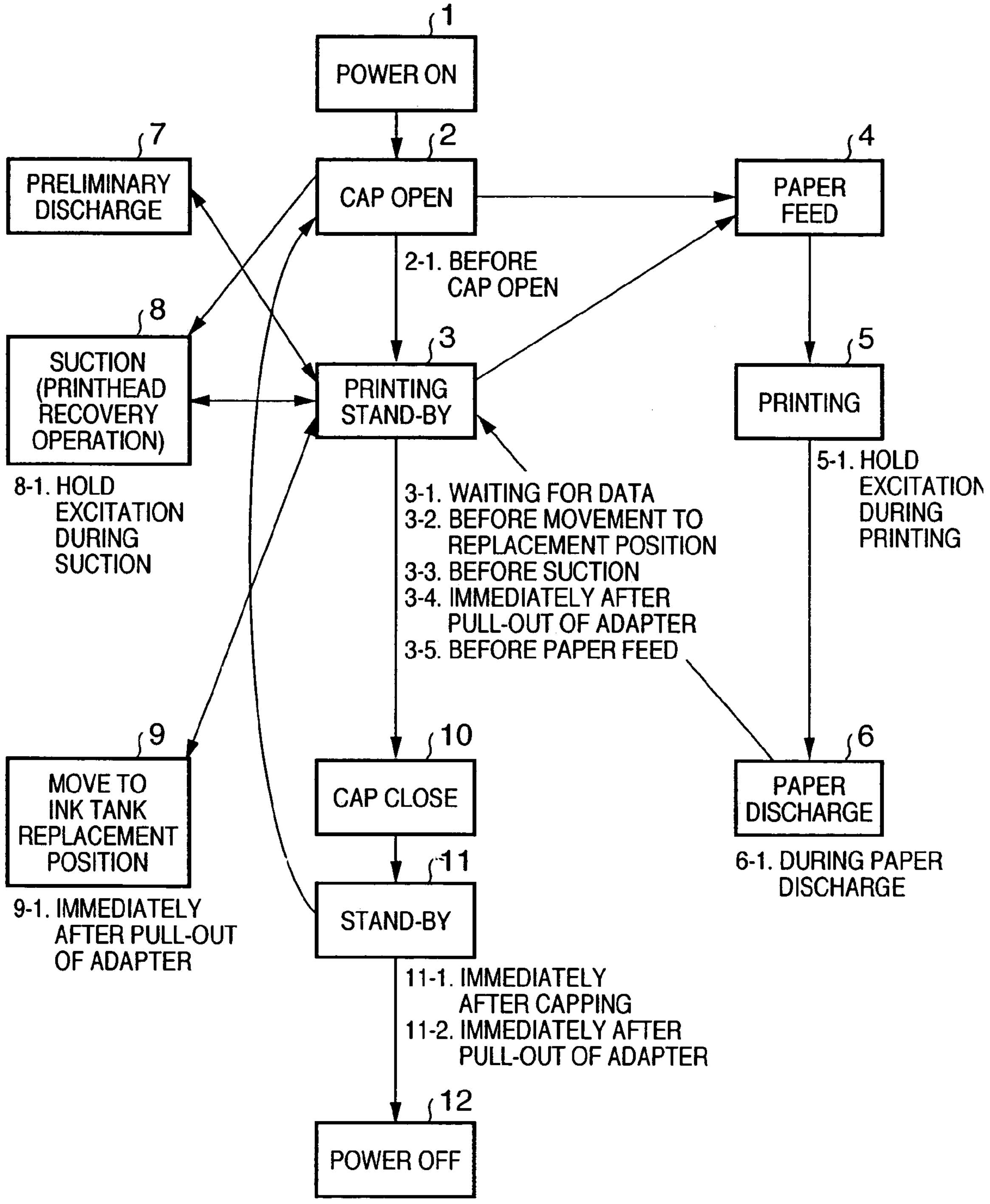

FIG. 5 is a state transition diagram showing an operation sequence of the printing apparatus from power-on.

In FIG. 5, blocks 1 to 12 represent operations necessary for printing regardless of AC driving or DC (battery) driving. Descriptions outside the blocks 1 to 12 indicate timing of battery voltage detection. In the present embodiment, dummy excitation is performed at these timings.

FIG. 6 is a residual capacity table referred to upon residual capacity control based on a detected battery voltage value.

In FIG. 6, the residual capacity control of the present embodiment is made based on the result of comparison between battery residual capacity (RES) and three threshold values a, b and c (a>b>c). That is, if RES>a,b holds, a residual capacity indication (indicating that the amount of residual capacity is large or medium) is made on the charge indicator 909. If c<RES≦b holds, a residual capacity warning indication (the amount of residual capacity is small) is made on the charge indicator 909 of the printer 800 and a display of the host device 610 or the like by using drivers installed in the host device 610. If RES≦c holds, a residual capacity error indication is made on the charge indicator 909 of the printer 800 and the display of the host device 610 or the like by using the drivers installed in the host device 610, and termination processing such as capping of the printhead 105 is performed.

Note that, in a case where the load on the battery changes depending on voltage detection timing, the residual capacity table as shown in FIG. 6 is prepared for each detection timing.

Returning to FIG. 5, when the user turns the power of the printer 800 on (block 1), the status of the printing apparatus changes to the block 2, in which initial operations necessary for printing such as cap opening of the printhead 105 are performed.

Once the initial operations have been performed, to turn the power off, it is necessary to perform termination operations such as printhead capping as shown in the block 10. At this time, if the residual capacity is insufficient, the printing apparatus is forced to be power-off before completion of the termination operations. Since this may damage the printhead, it must be most carefully avoided in operations of the printer 800.

In the present embodiment, dummy excitation is performed before the cap opening (timing 2-1 in FIG. 5), to check whether or not a battery residual capacity sufficient for at least capping is ensured. If the battery residual capacity (RES) is equal to or less than an error level (RES≦c), an error indication is made without performing cap opening.

After the power-on, if the next operation is not determined, the status of the printer 800 changes to printing stand-by in the block 3. Printing stand-by means waiting for a next instruction without capping the printhead 105. Normally, after the elapse of a predetermined period, the status of the printer 800 changes to capping in the block 10, however, if print data is stopped in the middle of data supply, the cap-open status may continue for a long time (timing 3-1 in FIG. 5). In the cap-open status, as it is necessary to ensure battery residual capacity sufficient for termination operations such as capping, it is necessary to perform dummy excitation at this timing so as to periodically check the battery residual capacity.

Further, if an ink tank replacement operation is determined in the printing stand-by status, the status of the printer 800 changes to a status in the block 9 where the carriage 104 moves to an ink tank replacement position. Accordingly, dummy excitation is performed before the carriage 104 moves to the ink tank replacement position (timing 3-2 in FIG. 5). It is checked by this dummy excitation whether or not the carriage 104 can afford to move to the ink tank replacement position and return to the initial position, and further, whether or not a battery residual capacity sufficient for the termination operations such as capping is ensured.

Further, when a suction operation is determined in the printing stand-by status, the status of the printer 800 changes a suction operation in the block 8. Accordingly, dummy excitation is performed before execution of the suction operation (timing 3-3 in FIG. 5). The suction operation is made for maintenance of the printhead 105.

Generally, if an inkjet printhead is not used for a long time, ink dries and its solute sticks to the nozzles. Especially in a thermal inkjet printing by discharging ink from nozzles utilizing bubbles created by adding thermal energy generated by sending an electric current to heaters, if the printhead is used for a long time, ink burns and sticks to the heaters. This disturbs excellent ink discharging, causes ink discharge failure, and as a result, degrades quality of printed images.

To prevent such inconvenience, it is necessary to forcibly suck ink from the nozzles of the printhead so as to maintain an excellent status of the printhead. As the suction operation is continuously performed along a sequence, once the operation starts, it cannot be stopped. Accordingly, it is checked before the suction operation whether or not a necessary battery residual capacity is ensured for completion of the suction operation and further for the termination operations such as capping.

Further, when the AC adapter (not shown) is pulled out from the "CHG-DC in" jack 907 in the printing stand-by status, immediately afterward, dummy excitation is performed (timing 3-4 in FIG. 5). As the printer 800 can be driven with electric power of the AC power source from the AC adapter, it is not necessary to detect the battery residual capacity in this case as described in the conventional art. In the case where the printer 800 is driven with the AC power source, when the AC adapter is pulled out from the "CHG-DC in" jack 907 and the apparatus driving is changed to battery driving, the battery residual capacity is unknown. Accordingly, dummy excitation is performed immediately after the switching to the battery driving to check the battery residual capacity.

Similarly, when the AC adapter is pulled out while the printer 800 is in the status of the block 9, i.e., in the status where the carriage 104 is in the ink tank replacement position, immediately afterward, dummy excitation is performed (timing 9-1 in FIG. 5) to check the battery residual capacity. Further, when the AC adapter is pulled out while the apparatus is in the stand-by status in the block 11, immediately afterward, dummy excitation is performed (timing 11-2 in FIG. 5) to check the battery residual capacity.

Note that, when the AC adapter is pulled out at other timings, dummy excitation is not performed since (1) dummy excitation itself cannot be performed (the conveyance (LF) motor 118 for dummy excitation is running) and (2) during motor driving, the sequence of periodical battery voltage detection at comparatively short intervals in the printer 800 is in process.

Further, when print data is received in the printing stand-by status, dummy excitation is performed before paper feeding (timing 3-5 in FIG. 5). This is because it is necessary to check whether or not a sufficient battery residual capacity is ensured for paper discharging after paper feeding for prevention of stoppage of all the operations of the printer 800 while the paper is fed in the apparatus, and further, for execution of the termination operations.

Note that in the present embodiment, before execution of dummy excitation before paper feeding, it is determined whether or not the print data transmitted from the host device 610 is data for one page of print sheet or data for plural pages of print sheets. If it is determined that the received print data is data for one page of print sheet, dummy excitation is performed before paper feeding. If it is determined that the received print data is data for plural pages of print sheets, dummy excitation is performed only before print sheet feeding of an initial page, then, dummy excitation is performed during paper discharging (timing 6-1 in FIG. 5) from printing for the next page, and the battery voltage detection is performed since it is apparent that the status of the printer 800 changes to discharging of the initial print sheet, then to printing for the next page, and to discharging of the next page. Note that the details of the battery voltage detection during paper discharging will be described later.

Figure 7:
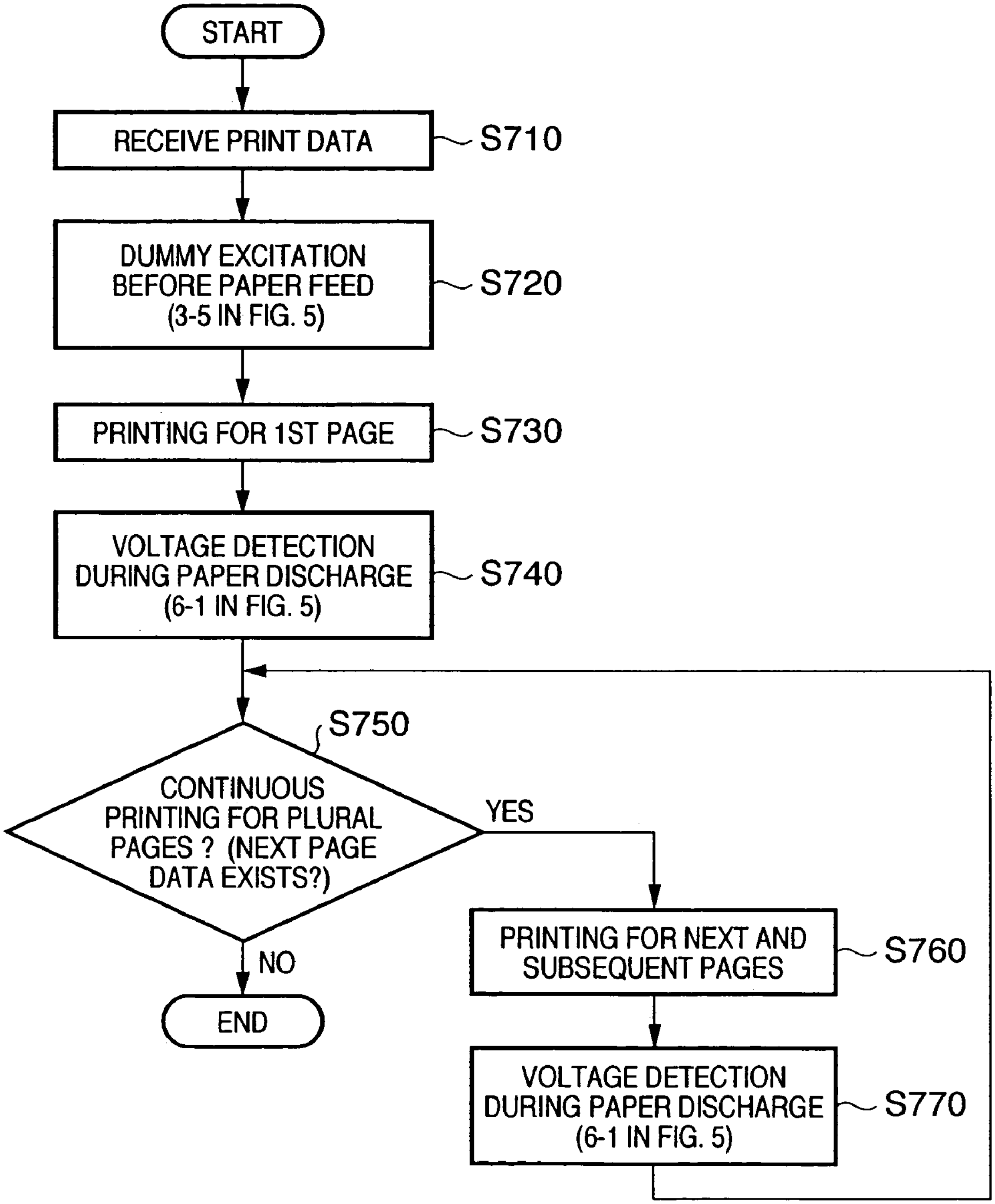
FIG. 7 is a flowchart showing control to change timing of battery voltage detection performed when print data is received and printing is performed.

FIG. 7 is a flowchart showing control to change timing of battery voltage detection performed when print data is received and printing is performed.

First, at step S710, print data is received from the host device 610, then at step S720, dummy excitation is performed before paper feeding as described above. Then at step S730, printing for one page of print sheet is performed.

In this case, the status of the printer 800 changes from the printing stand-by status in the block 3 to the paper feeding status in the block 4, and further, changes to the printing status in the block 5. During printing, battery voltage detection is performed at hold excitation timing (timing 5-1 in FIG. 5).

Note that "hold excitation" means excitation to stop the conveyance motor 118 which is being decelerated. During the hold excitation, as the conveyance of a print sheet is almost stopped, at this timing, the carriage 104 is generally accelerated so as to improve the printing throughput. The carriage 104, accelerated from the stopped status, then starts printing when it has entered a constant speed status. It is logically possible to control the print-sheet conveyance operation and the carriage moving operation to overlap with each other such that the printhead 105 mounted on the carriage 104 starts printing at the same time of stoppage of the print sheet.

During the printing in the block 5 in FIG. 5, the printer 800 has generally three types of load statuses on the driving motors. That is, (1) only the carriage motor 114 is under a load; (2) loads on the carriage motor 114 and the conveyance motor 118 overlap; and (3) only the conveyance motor 118 is under a load. As the conveyance motor 118 of the present embodiment is a stepping motor, in the case of (3), the load is most stable. More specifically, the conveyance motor 118 is under a load during the print sheet conveyance operation and is under a load for stoppage of the conveyance (the above-described hold excitation). The load of hold excitation is most stable.

However, in actual printing, for improvement of throughput, the status where only the conveyance motor 118 is under the load of hold excitation does not often exist.

Figure 8A:
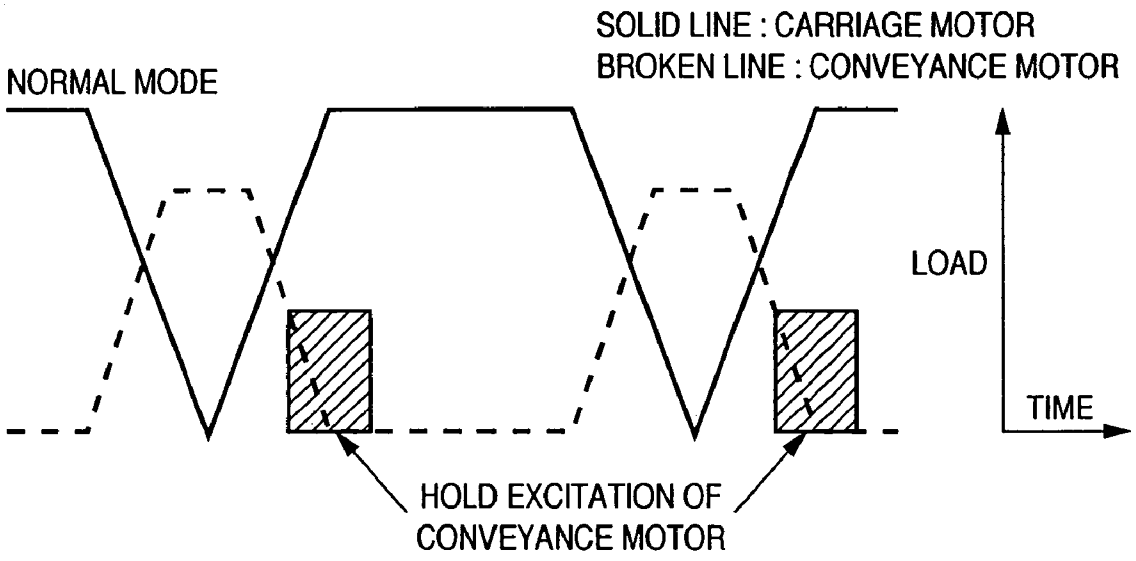
FIGS. 8A and 8B are timing charts showing time change of loads on a carriage motor and conveyance motor during printing.
Figure 8B:
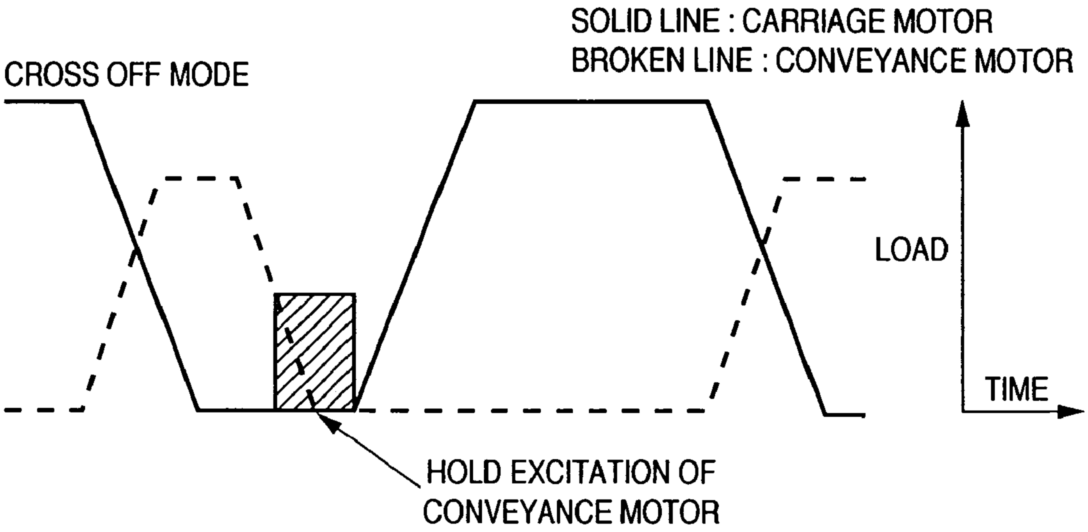

FIGS. 8A and 8B are timing charts showing time change of loads on a carriage motor and conveyance motor during printing.

As shown in FIG. 8A, in actual printing, the status where only the conveyance motor 118 is under the load of hold excitation does not often exist.

As the ink discharging from the printhead 105 is performed when the carriage 104 is moving at a constant speed, when the ink discharging for one carriage scanning has been completed and deceleration of the carriage motor 114 has been started, the print sheet conveyance operation can be started, and further, the print sheet conveyance operation can be completed between acceleration of the carriage 104 in a reversed direction immediately after the stoppage and the start of constant-speed status. Accordingly, in a case where a time period necessary for print sheet conveyance is shorter than a total period of carriage deceleration and acceleration, there is no status where only the conveyance motor is under the load of hold excitation.

Further, when the hold excitation load on the conveyance motor 118 and the load on the carriage motor 114 overlap, as the loads are unstable, a stable voltage value cannot be obtained in battery voltage detection in this time zone. Different from dummy excitation, this status is inappropriate for accurate detection of battery residual capacity. Accordingly, it is preferable to perform only the detection of error level of battery residual capacity in this time zone.

More specifically, in the case of dummy excitation, the battery residual capacity is detected in plural steps by using the residual capacity table as shown in FIG. 6, however, in the case of hold excitation, sufficient accuracy cannot be attained in detection of battery residual capacity in such plural steps. Accordingly, in the present embodiment, the battery residual capacity (RES) obtained by hold excitation is compared with only the threshold value c, and it is determined as the result of battery residual capacity detection whether or not RES≦c holds, i.e., whether or not the battery residual capacity is equal to or lower than the error level.

However, even in the case of detection of only the error level of battery residual capacity, if the detection accuracy is low, there is a possibility that it is detected as if the residual capacity were equal to or lower than the error level even though the battery residual capacity is still sufficient, or error level status cannot be detected even though the battery residual capacity is actually equal to or lower than the error level.

To prevent such inconvenience, in the present embodiment, when battery residual capacity detection is performed by hold excitation, the following two control operations are performed.

The first control is to obtain a mean value of plural detection values without using a detected voltage value. In the present embodiment, battery voltages detected by past four hold excitations are stored in the RAM 604, and a mean value of a current detection value and the past voltage values, i.e., total five detection values, is used as a voltage detection value by hold excitation. Thereafter, the oldest voltage detection value is deleted from the RAM 604, and the voltage detection value obtained by the current hold excitation is stored. In this manner, as the printer 800 always holds battery voltages detected by past four hold excitations, a mean value of five detection results including a current voltage detection value by hold excitation can be used as a voltage detection value by the hold excitation all the time.

The second control is to provide a mode where hold excitation of the conveyance motor 118 and the carriage moving operation of the carriage motor 114 do not overlap (cross off mode), i.e., the hold excitation and the carriage moving operation do not concurrently occur, then if it is once determined from the mean value of the above-described five detection results that the battery residual capacity has become the error level (i.e., RES≦c), change the driving motor operation mode to the cross off mode as shown in FIG. 8B. By this control, it is possible to obtain a sufficient time period where hold excitation of the conveyance motor 118 does not overlap with the load on the other driving motor and only the conveyance motor 118 is under the load of hold excitation. Thus, more accurate battery voltage detection can be performed. As a result, even in a case where it takes a long time to perform printing for one page of a print sheet, consumption of the battery power source can be detected, thereby the termination operations can be properly performed before power-off of the apparatus.

On the other hand, if RES>c holds, the driving motor operation mode is changed to a normal mode as shown in FIG. 8A, in which the carriage motor 114 and the conveyance motor 118 are simultaneously actuated so as to prevent reduction of the printing speed while the loads on both motors overlap.

Note that, if the load of hold excitation and that of dummy excitation are different, different residual capacity tables are prepared. The control for the battery residual capacity detection by hold/dummy excitation is performed by referring to an appropriate residual capacity table.

When the printing at step S730 has been completed, the process proceeds to step S740, at which the status of the printer 800 enters the paper discharging status in the block 6. At step S740, during discharging of the print sheet where the printing has been performed (timing 6-1 in FIG. 5), battery voltage detection is performed. At this timing, different from hold excitation during printing, the carriage 114 does not operate and only the conveyance motor 118 is under the load. Further, as the paper discharging requires a relatively long time, sufficient time can be used for battery voltage detection and stable voltage detection can be performed. Note that, in a case where the load on the conveyance motor 118 upon dummy excitation is different from that upon paper discharging, different residual capacity tables are prepared. The control for the battery residual capacity detection is performed by referring to an appropriate residual capacity table.

When the paper discharging is completed, the process proceeds to step S750, at which it is checked whether or not print data exists for the next print sheet. If no print data for the next page exists, the status of the printer 800 changes from the paper discharging status to the printing stand-by status. Accordingly, the processing in FIG. 7 ends. On the other hand, if print data for the next page exists, the process proceeds to step S760, at which printing for the second and subsequent pages is performed. During this printing, battery voltage detection is performed at the hold excitation timing (timing 5-1 in FIG. 5) as described above. When the printing has been completed, the process proceeds to step S770, at which battery voltage detection is performed during discharging of the print sheet where the printing has been made (timing 6-1 in FIG. 5) as in the case of step S740. Then, the process returns to step S750.

By the above-described control sequence, as it is not necessary to perform dummy excitation before each paper feeding, reduction of throughput upon continuous printing on plural pages of print sheets can be prevented, and battery voltage detection can be performed by printing for each page.

Returning to FIG. 5, during the printing stand-by status, if the next instruction has not been received for a predetermined period, the status of the printer 800 enters the status in the block 10, i.e., the capping of the printhead 105 is performed, and the status of the printer enters the status in the block 11, i.e., the stand-by status.

If the AC adapter is pulled out from the "CHG-DC in" jack 907 in the cap-open status before the status of the printer 800 enters the stand-by status, dummy excitation is performed only in the printing stand-by status and only when the carriage 104 has moved to the ink tank replacement position. When the AC adapter is pulled out at other timings, the battery voltage is unknown until the next voltage detection timing comes. There is no problem if the next voltage detection is ensured, however, if the AC adapter is pulled out during the cap-opening or the capping, the status of the printer 800 enters the stand-by status without execution of voltage detection. In such a case, the battery voltage is unknown until the user issues the next printing command.

In the present embodiment, to avoid this inconvenience, dummy excitation is performed immediately after the completion of capping and the start of the stand-by status, i.e., immediately after the completion of capping (timing 11-1 in FIG. 5). Note that, when the AC adapter is pulled out in the stand-by status (timing 11-2 in FIG. 5), the battery voltage is detected by performing dummy excitation as described above.

The above control can prevent the inconvenience that the battery residual capacity is unknown for a long time, regardless of timing of pull-out of the AC adapter.

Note that, in the dummy excitation performed immediately after the pull-out of the AC adapter in the stand-by status of the printer 800, different from dummy excitation performed in other cases, there is a possibility that a low-load status has continued for a long time and an apparent voltage is high. To prevent inaccurate voltage detection in such a status, in the present embodiment, the dummy excitation is performed for a long time, or battery voltage detection is performed under a higher load in comparison with dummy excitation in other cases, thereby the accuracy of voltage detection is improved.

Further, in a case where the stand-by status continues for a predetermined period, the status of the printer 800 enters the power-off status and printer operation stops for prevention of battery waste.

As described above, according to the present embodiment, upon battery residual capacity detection by hold excitation during printing, a mean value of plural detection values is obtained and it is determined whether or not the battery residual capacity has become equal to or lower than an error level. Further, if it is determined once that the battery residual capacity has become equal to or lower than the error level, the driving motor operation mode is changed to a mode where the hold excitation of the conveyance motor 118 and the carriage moving operation of the carriage motor 114 do not overlap (cross off mode). Thus, a time where only the conveyance motor 118 is under the load of hold excitation is sufficient, and more accurate battery voltage detection can be performed, and further, reduction of throughput can be minimized.

In this manner, a battery power source can be more efficiently used for printing.

A determination as to whether or not there is print data for the next page may be performed during printing for one page instead of before performing dummy excitation before paper sheet feeding. For example it may be determined during printing for the first page whether or not there is print data for the second page.

In the above embodiment, droplets discharged from the printhead are ink droplets, and liquid stored in the ink tank is ink. However, the liquid to be stored in the ink tank is not limited to ink. For example, processing liquid or the like to be discharged onto a print medium so as to improve the fixing property or water repellency of a printed image or its image quality may be contained in the ink tank.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this inkjet printer and printing method, a high-density, high-precision printing operation can be attained.

As the typical arrangement and principle of the inkjet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

Further, in the above embodiment, the printing apparatus is a serial type printing apparatus which performs printing by scanning a printhead, however, a full line type printing apparatus using a full line type printhead having a length corresponding to the width of a maximum printing medium can be used. As a full line type printhead, either the arrangement which satisfies the full-line length by combining a plurality of printheads as disclosed in the above specification or the arrangement as a single printhead obtained by forming printheads integrally can be used.

In addition, not only a cartridge type printhead in which an ink tank is either integrally arranged or separably attached on the printhead itself as described in the above embodiment but also an exchangeable chip type printhead which can be electrically connected to the apparatus main body and can receive ink from the apparatus main body upon being mounted on the apparatus main body can be employed.

It is preferable to add recovery means for the printhead, preliminary auxiliary means and the like to the above-described construction of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in the above-mentioned embodiment of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the inkjet system, so that the ink viscosity can fall within a stable discharge range.

In addition, the printing apparatus of the present invention may be used in the form of a copying machine combined with a reader and the like, or a facsimile apparatus having a transmission/reception function in addition to an image output terminal of an information processing apparatus such as a computer.

As many apparently widely different embodiments of the present invention can be made without departing from the spirit and scope thereof, it is to be understood that the invention is not limited to the specific embodiments thereof except as defined in the appended claims.

What is claimed is:

1. A battery residual capacity detection method in a printing apparatus operable with at least a battery power source, said method comprising:

a detection step of detecting a battery voltage thereby detecting a battery residual capacity while printing is performed on a printing medium by reciprocate-scanning a printhead mounted on the printing apparatus;

a determination step of determining whether or not the battery residual capacity detected at said detection step is equal to or less than a predetermined threshold value; and a detection control step of controlling driving of a carriage motor to reciprocate-scan the printhead and driving of a conveyance motor to convey the printing medium so as to provide a time zone where a load on the carriage motor and that on the conveyance motor do not overlap in accordance with the determination result at said determination step, and controlling said detection step so as to detect the battery residual capacity in the time zone where the loads do not overlap, wherein the time zone in which the loads do not overlap includes a time zone after excitation to stop the conveyance motor to stop conveyance of the printing medium and before driving of the carriage motor to move the printhead.

2. The method according to claim 1, wherein the conveyance motor is a stepping motor.

3. The method according to claim 1, wherein said detection control step includes a drive control step of, if it is determined at said determination step that the battery residual capacity is greater than the predetermined threshold value, controlling the driving of the carriage motor and that of the conveyance motor so as to provide a time zone where the carriage motor and the conveyance motor are simultaneously driven, to increase a printing speed.

4. The method according to claim 1, wherein the printing apparatus is also operable with an AC power source.

5. The method according to claim 1, wherein the printhead is an inkjet printhead.

6. A printing apparatus operable with at least a battery power source, comprising:

a carriage motor to generate a driving force to reciprocate-scan a carriage holding a printhead;

a conveyance motor to generate a driving force to convey a printing medium;

detection means for detecting a battery voltage thereby detecting a battery residual capacity while printing is performed by the printhead on the printing medium by reciprocate-scanning of the carriage;

determination means for determining whether or not the battery residual capacity detected by said detection means is equal to or less than a predetermined threshold value; and detection control means for controlling driving of said carriage motor to reciprocate-scan the printhead and driving of said conveyance motor to convey the printing medium so as to provide a time zone where a load on said carriage motor and that on said conveyance motor do not overlap in accordance with the determination result of said determination means, and controlling said detection means so as to detect the battery residual capacity in the time zone where the loads do not overlap, wherein the time zone where the loads do not overlap includes a time zone after excitation to stop said conveyance motor to stop conveyance of the printing medium and before driving of said carriage motor to move the printhead.

7. The apparatus according to claim 6, wherein said conveyance motor is a stepping motor.

8. The apparatus according to claim 6, wherein said detection control means includes drive control means for, if it is determined by said determination means that the battery residual capacity is greater than the predetermined threshold value, controlling the driving of said carriage motor and that of said conveyance motor so as to provide a time zone where said carriage motor and said conveyance motor are simultaneously driven, to increase a printing speed.

9. The apparatus according to claim 6, wherein said printing apparatus is also operable with an AC power source.

10. The apparatus according to claim 6, wherein the printhead is an inkjet printhead.

11. The apparatus according to claim 10, wherein the inkjet printhead has an electrothermal transducer to generate thermal energy to be supplied to ink for discharging the ink by utilizing the thermal energy.

* * * * *

UNITED STATES PATENT AND TRADEMARK OFFICE

CERTIFICATE OF CORRECTION

PATENT NO. : 7,052,105 B2
APPLICATION NO. : 10/765857
DATED : May 30, 2006
INVENTOR(S) : Ushigome It is certified that error appears in the above-identified patent and that said Letters Patent is hereby corrected as shown below:

COLUMN 4:
Line 16, "ink-jet" should read --inkjet--.

COLUMN 5:
Line 3, "includes" should read --include--.

COLUMN 6:
Line 55, "pickup" (2nd occurrence) should read --pick up--.

COLUMN 8:
Line 50, "block 10," should read --block 10;--.

COLUMN 11:
Line 17, "FIG. 6," should read --FIG. 6;--.

COLUMN 13:
Line 3, "ensured," should read --ensured;--.

COLUMN 14:
Line 3, "ink-jet" should read --inkjet--.
Line 10, "a continuous" should read --continuous--.
Line 34, "printhead," should read --printhead;--.

Signed and Sealed this

Twenty-ninth Day of April, 2008

JON W. DUDAS
*Director of the United States Patent and Trademark Office*